United States Patent
Ferris et al.

(10) Patent No.: US 8,402,139 B2
(45) Date of Patent: Mar. 19, 2013

(54) METHODS AND SYSTEMS FOR MATCHING RESOURCE REQUESTS WITH CLOUD COMPUTING ENVIRONMENTS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 231 days.

(21) Appl. No.: 12/714,113

(22) Filed: Feb. 26, 2010

(65) Prior Publication Data

US 2011/0213884 A1    Sep. 1, 2011

(51) Int. Cl.
*G06F 15/16* (2006.01)
(52) U.S. Cl. .................................. 709/226; 709/224
(58) Field of Classification Search .......... 709/200–203, 709/217–227, 228–229, 230
See application file for complete search history.

(56) References Cited

U.S. PATENT DOCUMENTS

| | | | | |
|---|---|---|---|---|
| 5,475,819 | A * | 12/1995 | Miller et al. | 709/203 |
| 6,195,682 | B1 * | 2/2001 | Ho et al. | 709/203 |
| 6,463,457 | B1 | 10/2002 | Armentrout et al. | |
| 6,604,142 | B1 * | 8/2003 | Bertrand et al. | 709/227 |
| 6,636,590 | B1 * | 10/2003 | Jacob et al. | 379/114.05 |
| 7,170,899 | B2 * | 1/2007 | Marce | 370/410 |
| 7,224,781 | B2 * | 5/2007 | Jacob et al. | 379/114.05 |
| 7,313,796 | B2 | 12/2007 | Hamilton et al. | |
| 7,439,937 | B2 | 10/2008 | Ben-Shachar et al. | |
| 7,453,998 | B2 * | 11/2008 | Jacob et al. | 379/114.05 |
| 7,461,166 | B2 * | 12/2008 | Doyle et al. | 709/238 |
| 7,467,206 | B2 * | 12/2008 | Moore et al. | 709/225 |
| 7,475,149 | B2 * | 1/2009 | Jacob et al. | 709/228 |
| 7,529,785 | B1 | 5/2009 | Spertus et al. | |
| 7,546,462 | B2 | 6/2009 | Upton | |
| 7,568,199 | B2 * | 7/2009 | Bozak et al. | 718/104 |
| 7,573,988 | B2 * | 8/2009 | Lee et al. | 379/88.17 |
| 7,596,620 | B1 | 9/2009 | Colton et al. | |
| 7,995,723 | B2 * | 8/2011 | Jacob et al. | 379/114.05 |
| 8,244,882 | B2 * | 8/2012 | Davidson | 709/228 |
| 2001/0039497 | A1 | 11/2001 | Hubbard | |
| 2002/0069276 | A1 | 6/2002 | Hino et al. | |
| 2002/0165819 | A1 | 11/2002 | McKnight et al. | |
| 2003/0037258 | A1 | 2/2003 | Koren | |
| 2003/0110252 | A1 | 6/2003 | Yang-Huffman | |
| 2003/0115259 | A1 * | 6/2003 | Lakshmi Narayanan | 709/203 |
| 2003/0135609 | A1 | 7/2003 | Carlson et al. | |
| 2004/0088410 | A1 * | 5/2004 | Flynn et al. | 709/225 |
| 2004/0162902 | A1 | 8/2004 | Davis | |
| 2004/0210591 | A1 | 10/2004 | Hirschfeld et al. | |
| 2004/0210627 | A1 | 10/2004 | Kroening | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Moustafa M Meky
(74) *Attorney, Agent, or Firm* — Lowenstein Sandler LLP

(57) ABSTRACT

A matching system can provide matching services to users of cloud computing environments. The matching system can receive user requests for sets of services. Once received, the matching system can collect information about available cloud appliances. The matching system can match the cloud appliances with the user requested services and provide the user with information related to available cloud appliances that meet the user's request.

20 Claims, 5 Drawing Sheets

U.S. PATENT DOCUMENTS

| | | | |
|---|---|---|---|
| 2004/0260597 A1* | 12/2004 | Nishikawa et al. ............... | 705/9 |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0069995 A1* | 3/2006 | Thompson et al. ........... | 715/700 |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0091613 A1 | 4/2008 | Gates et al. | |
| 2008/0104608 A1 | 5/2008 | Hyser et al. | |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0113051 A1* | 4/2009 | Franklin ....................... | 709/225 |
| 2009/0132491 A1* | 5/2009 | Desaraju et al. ................. | 707/3 |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0299366 A1 | 11/2010 | Stienhans et al. | |
| 2011/0016214 A1 | 1/2011 | Jackson | |
| 2011/0131335 A1 | 6/2011 | Spaltro et al. | |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Morgan, "Systems and Methods for Detecting Resource Consumption Events Over Sliding Intervals in Cloud-Based Network", U.S. Appl. No. 13/149,235, flied May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, fled May 27, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan et al., "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris et al., "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris at al., "Systems and Methods for Service Aggregation Using Graduated Service Levels in a Cloud Network", U.S. Appl. No. 12/628,112, filed Nov. 30, 2009.

Ferris at al., "Methods and Systems for Generating a Software License Knowledge Base for Verifying Software License Compliance in Cloud Computing Environments", U.S. Appl. No. 12/628,156, filed Nov. 30, 2009.

Ferris at al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Systems and Methods for Generating Cross-Cloud Computing Appliances", U.S. Appl. No. 12/714,315, filed Feb. 26, 2010.

Ferris at al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris at al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris at al., "Systems and Methods for Cross-Vendor Mapping Service in Cloud Networks", U.S. Appl. No. 12/790,162, filed May 28, 2010.

Ferris at al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

* cited by examiner

METHODS AND SYSTEMS FOR MATCHING RESOURCE REQUESTS WITH CLOUD COMPUTING ENVIRONMENTS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications.

In cases, however, a network administrator may wish to set up a set of software appliances specifically in a network cloud environment. Software appliances generally involve the encapsulation of a pre-defined application or applications with a reduced version of an operating system (OS), such as the Linux™ operating system. Software appliances in one regard thereby represent a relatively compact, ready-to-install application solution and can be distributed via media such as CD-ROM discs, or downloaded for installation. Software appliances can be distributed and installed in a variety of environments, including stand-alone and networked environments. A population of software appliances can be managed on a network from a centralized monitor or host, including to track the software provisioning, user authorizations, execution states, and other attributes of the deployed appliances.

For example, a user may wish to set up and instantiate a virtual server from the cloud to create a storefront to market products or services on a temporary basis. The user can lease or subscribe to the set of resources needed to build and run the set of instantiated virtual machines on a comparatively short-term basis, such as hours or days, for their intended application.

In the context of a set of virtual (or cloud) appliances that are instantiated in a cloud environment, issues in the configuration and deployment of the appliances can arise. For instance, typically users request resources for a given purpose from a cloud provider, and the cloud provider then transparently instantiates the appropriate virtual appliances in various invisible configurations. However, users may want to better understand and receive information regarding the instantiated virtual appliances, understand all of the available virtual appliance configurations, and/or how they can or should transfer previously purchased licenses or subscriptions to the cloud.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
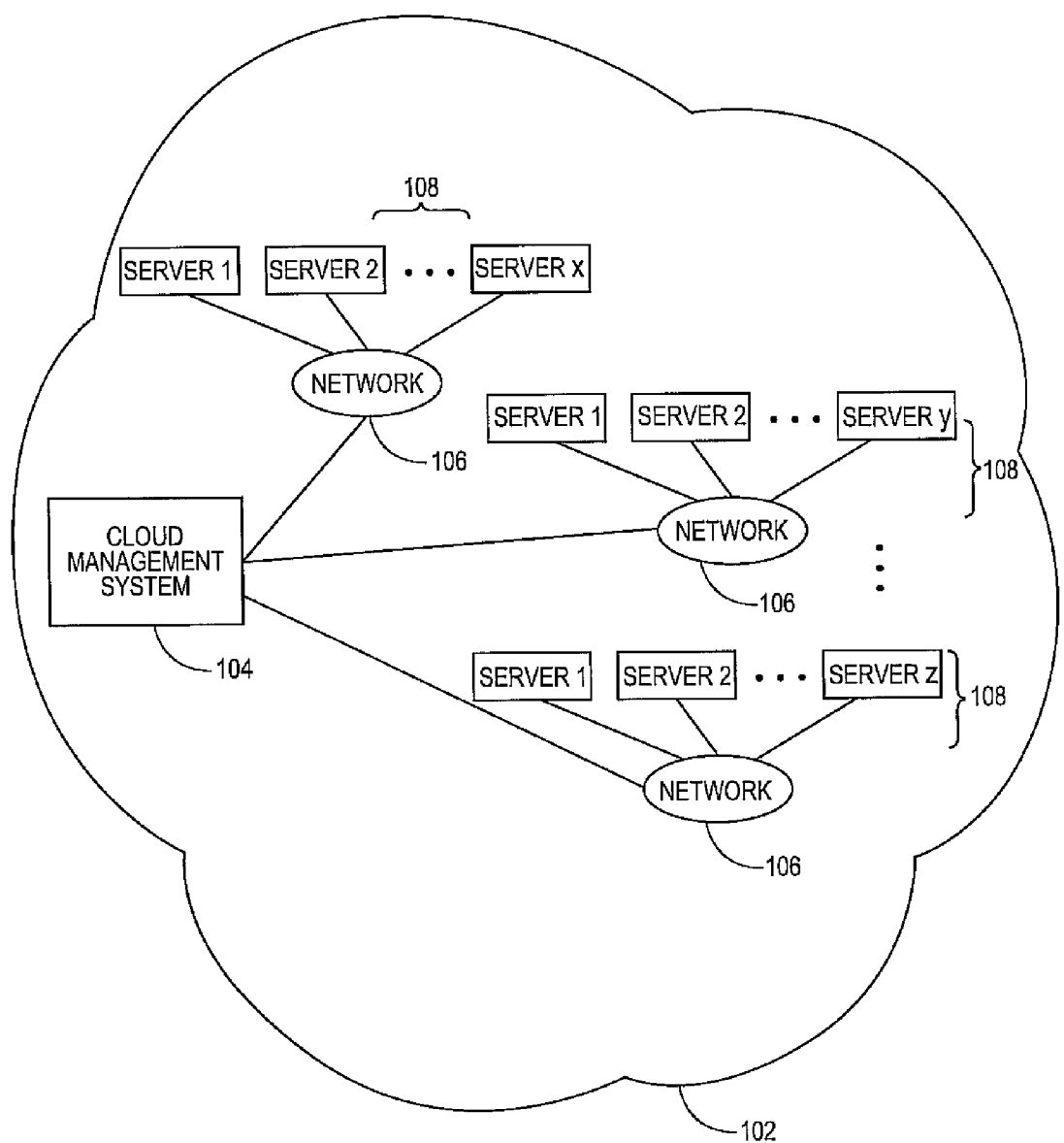
FIG. 1 illustrates an overall cloud system architecture in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for independently matching requested resources with cloud computing environments. More particularly, embodiments relate to platforms and techniques in which a matching system can match requested resources to virtual appliances within cloud computing environments for users.

According to embodiments, a matching system can be configured to provide matching services to users of cloud computing environments. In particular, the matching system can be configured to receive a request to instantiate a set of services from a user. Once received, the matching system can be configured to match the requested resources with available cloud appliances based on information collected by the matching system. The matching system can then provide the collected information about the matched available cloud appliances to the user.

According to embodiments, the collected information can come from various sources, including cloud provider catalogs. The requested set of services can include deployment recommendation information. Alternatively, the requested set of services can correspond to a previously purchased license, resource credit (e.g., credit for SaaS consumption, etc.) or subscription. Likewise, the matching system can be configured to compare the resource requirements of the previously purchased license, resource credit, or subscription to the resources of the available cloud appliances and then identify at least one combination of cloud appliances that meet the resource requirements of the previously purchased license or subscription. The previously purchased license, resource credit, or subscription can be, for example, an on-premise license, resource credit, or subscription.

By providing matching services, the matching system can enable the user to understand and review the various available cloud appliances that correspond to a requested set of resources. The matching system also can enable a user to understand and review the consequences of transferring their previously purchased licenses, resource credits, or subscriptions.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
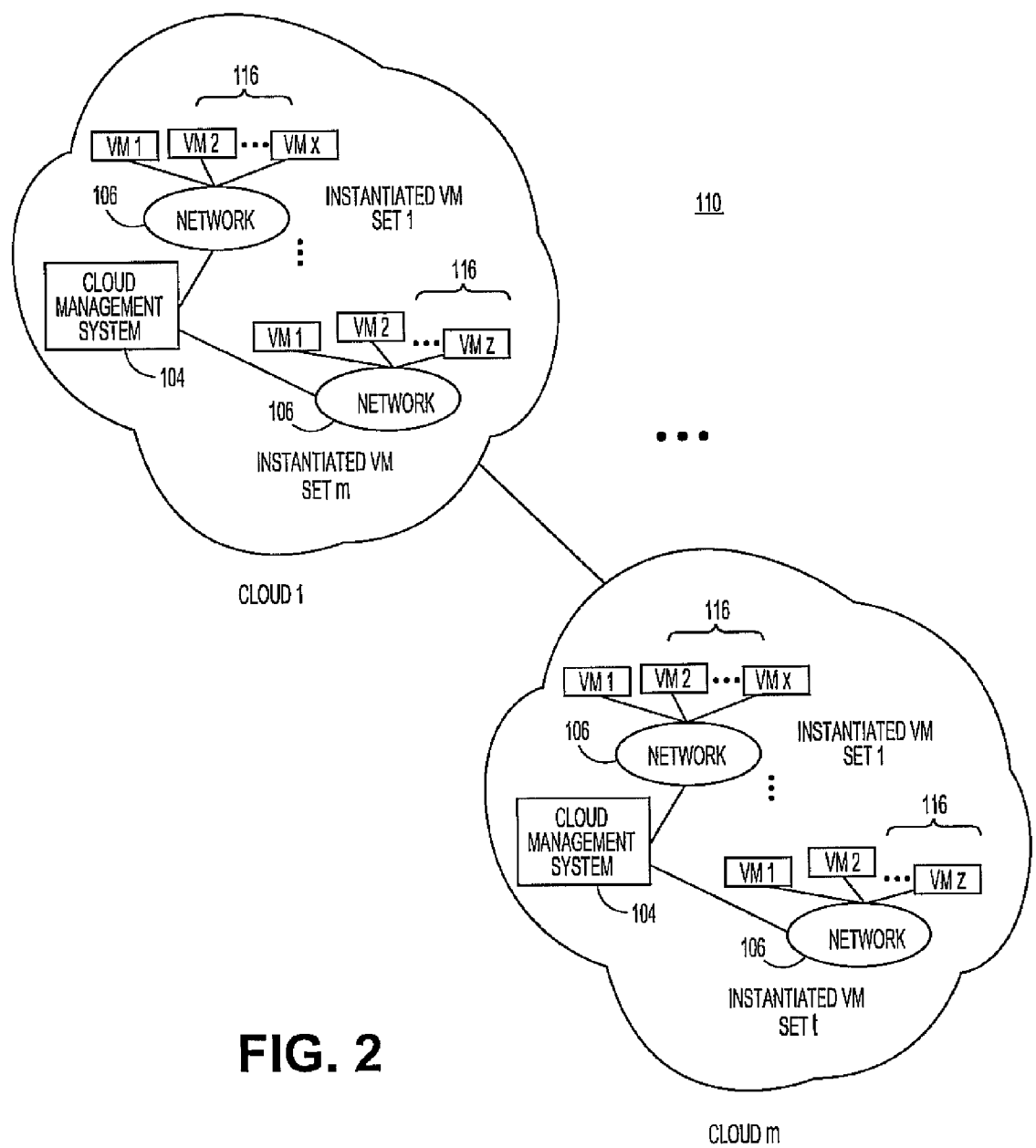
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can match operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
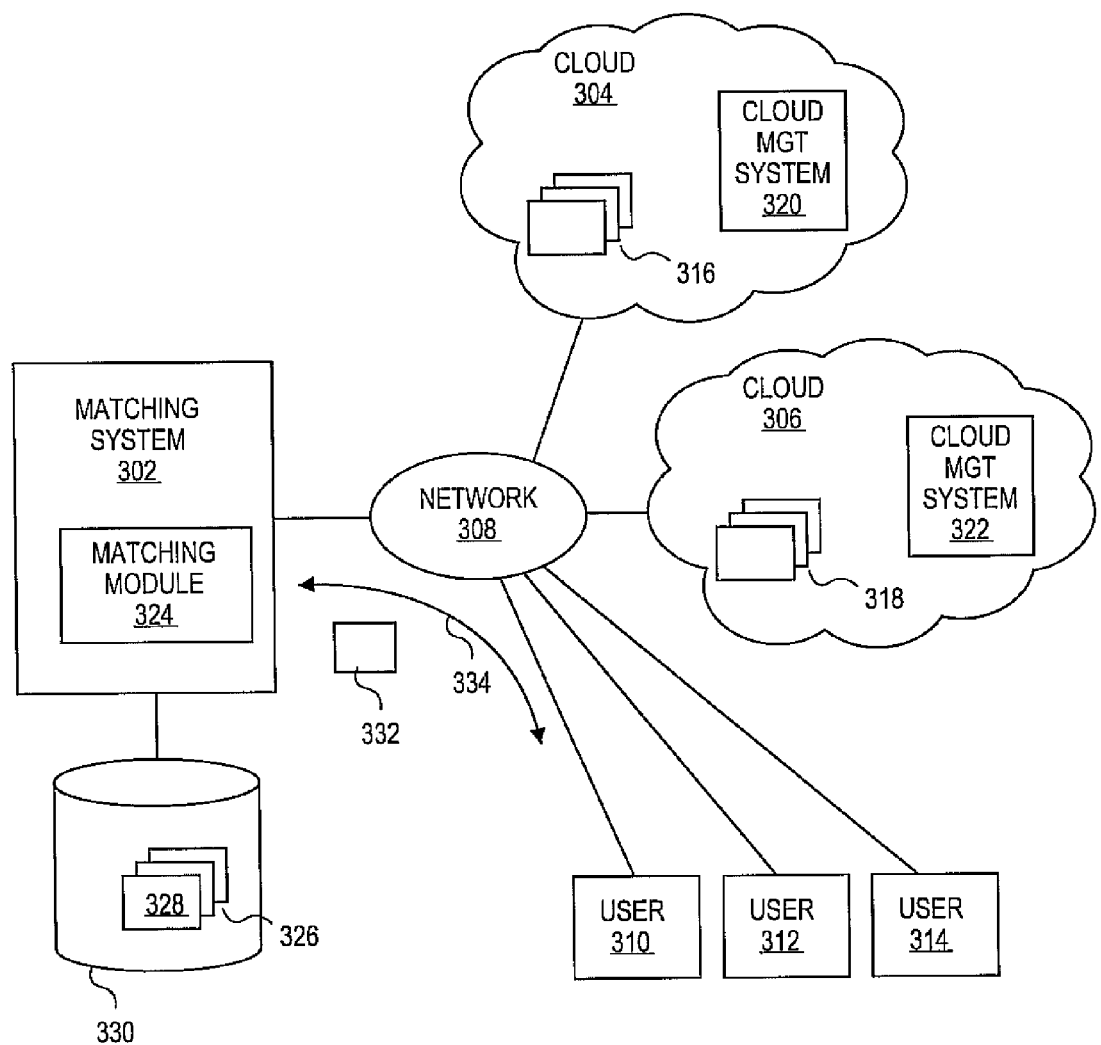
FIG. 3 illustrates an overall system in which a matching system can provide matching services to users of multiple clouds, according to various embodiments.

FIG. 3 illustrates aspects in which a matching system 302 can communicate with clouds 304 and 306, via one or more networks 308, according to various embodiments. While FIG. 3 illustrates various components of the matching system 302 and the clouds 304 and 306, one skilled in the art will realize that components can be added or removed.

In embodiments, one or more users 310, 312, and 314 can utilize one or more of the clouds 304 and 306 to support computing processes of the user 310, 312, and 314. The computing processes can be any type of computing processes, such as virtual machines, software appliances, software programs, cloud appliances, etc. For example, the user 310 can utilize the cloud 304 to support cloud appliances 316 and can utilize cloud 306 to supporting cloud appliance 318. The users 310, 312, and 314 can be any type of entity, such as individual users, corporations, companies, universities, and the like, that utilizes the clouds 304 and 306 to support computing processes. While FIG. 3 will be described with reference to user 310, one skilled in the art will realize that the processes and methods can be applied to any of the users 310, 312, and 314 or any other users. Additionally, while FIG. 3 illustrates three users 310, 312, and 314, one skilled in the art will realize that methods and processes can apply to any number of users.

In embodiments, the clouds 304 and 306 can be any type of cloud computing environments, such as the cloud computing environments described above in FIGS. 1 and 2. As described above, the clouds 304 and 306 can include any number of computing systems to support the cloud appliances 316 and/or 318 in the cloud. The computing systems can be any type of computing systems capable of supporting cloud appliances 316 and/or 318, such as servers, laptops, desktops, and the like. The computing systems can include a number of hardware resources, which are used to support cloud appliances 316 and/or 318 in the clouds 304 and 306, such as processors, memory, network hardware and bandwidth, storage devices, etc. Additionally, the clouds 304 and 306 can include cloud management systems 320 and 322, respectively. The cloud management systems 320 and 322 can be supported by the computing resources of the clouds 304 and 306, respectively.

In embodiments as shown, cloud appliances as a specific type of virtual machine can be built and instantiated. In embodiments as shown, a set of cloud appliances corresponding to computing processes 316 and/or 318 can be built and instantiated at the request of user 310 or an operator (not shown) via matching system 302. Each appliance in the set of cloud appliances 316 and/or 318 can be provisioned with a set of applications, such as media, messaging, or other applications or software as well as supporting operating system, processing power, and other resources. In embodiments, each of the appliances in the set of cloud appliances 316 and/or 318 can be provisioned or configured with the same set of applications and/or other resources, or in embodiments can be provisioned or configured with different applications and/or other resources. Appliance state data can contain data relating to the configuration state, execution state, input/output state, or other state of any one or more of the appliances in set of cloud appliances 316 and/or 318.

In embodiments, the cloud 304 and/or 306 can be operated and controlled by any number of entities. For example, the cloud 304 and/or the cloud 306 can be owned and/or operated by a cloud vendor, such as Amazon™, Inc., in order to provide the services of the the cloud 304 and/or the cloud 306 to subscribers and customers. Likewise, for example, the cloud 304 and/or the cloud 306 can be owned and/or operated by one or more of the users 310, 312 and 314, and the resources of the the cloud 304 and/or the cloud 306 can be used by the entity, internally, to support various computing processes. As such, in either case, the cloud 304 and the cloud 306 can be configured to include hardware, described above, and software resources to support computing processes, e.g., cloud appliances. For example, if the cloud 304 and/or the cloud 306 is operated by a cloud vendor, the software resources can include operating systems, such as a distribution of Linux provided by Red Hat™ Corporation, and various application programs requested or typically desired by subscribers, such as middleware applications, web hosting applications, electronic mail (email) applications, and the like. Likewise, for example, if the cloud 304 and/or the cloud 306 is operated by an entity for internal use, the software resources can include software resources required to support the specific internal uses. For instance, the cloud can be utilized by a corporation to perform simulations on a product and the software resources can include operating systems and application programs to run the simulations.

In embodiments, the one or more networks 308 can be or include the Internet, or other public or private networks and can be or include wired, wireless, optical, and other network connections. One skilled in the art will realize that the one or more networks 308 can be any type of network, utilizing any type of communication protocol, to connect the computing systems.

In embodiments, the matching system 302 can be configured to match requests (not shown) for sets of resources to available cloud appliances for the one or more users 310, 312, and 314. The matching system 302 can be configured to receive requests for services from users 310, 312, and 314 and match the requests to available cloud appliances 316 and/or 318. The matching services provided by the matching system 302 can also provide information 332 corresponding to the matched available cloud appliances to the users 310, 312, and 314.

In embodiments, the matching system 302 can be operated by an entity that provides the matching services to the users 310, 312, and 314. The matching services can be provided to the users 310, 312, and 314 at a fee. The matching system 302 can be supported by one or more computing systems, such as servers, laptops, desktops, and the like. The matching system 302 can include conventional components of a computing system, such as such as processors, memory, network interfaces, storage devices, etc.

In embodiments, to provide the matching services, the matching system 302 can be configured to include a matching module 324. The matching module 324 can be configured to cooperate and communicate with the users 310, 312, and 314 and to report (or provide) any gathered information 332 to the users 310, 312, and 314. Likewise, the matching module 324 can be configured to cooperate and communicate with the clouds 304 and 306 to collect and to match available cloud appliances 316 and/or 318 supported by the cloud 304 and 306 to user requested services. The matching module 324 can be implemented as a software program that is configured to execute on the matching system 302. Likewise, the matching module 324 can be implemented as a portion of other software programs configured to execute on the matching system 302. In either case, the matching module 324 can be configured to include the necessary logic, commands, instructions, and protocols to perform the processes described below. In any implementation, the matching module 324 can be written in any type of conventional programming language such as C, C++, JAVA, Perl, and the like. Additionally, the matching module 324 can be stored in computer readable storage devices or media (CD, DVD, hard drive, portable storage memory, etc.) whether local to the matching system 302 or remotely located.

In embodiments, the matching module 324 can be configured to provide an interface 334 to receive a request for the matching services. The interface 334 can be configured to provide the details and terms of the matching services (matching services offered, fee, etc.). To achieve this, the matching module 324 can be configured to include the necessary logic, commands, instructions, and protocols to generate and provide the interface 334, such as command line or graphical user interfaces (GUIs), to receive the request for the matching services. The matching module 324 can be configured to provide the interface 334 to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol. Likewise, the matching module 324 can be configured to allow software programs executing on the computing systems of the user 310 to provide requests. The matching module 324 can be configured to include an application programming interface (API) to provide the interface 334 that allows software programs of the user 310 to call the matching module 324 and provide the request.

In embodiments, the request to instantiate a set of services can include recommended deployment options from, for example, a deployment decision assistant or other wizard type logic that can determine various resource configurations based on a user's current service information. The deployment options can include resource configurations that can be matched to various cloud appliance configurations. The requested set of services can include current service information, proposed future growth, etc., including, for example, the number of users of a set of applications, the expected growth in users, the current processing resources used, etc. Alternatively, the request can include information related to previously purchased licenses, resource credits, or subscriptions, for example, an on-premise socket-based license of a vendor/application combination for a given number of users, e.g., Adobe-Acrobat, etc.

In embodiments, the matching system 302 can communicate with multiple repositories or databases 330 (only one database shown). Database 330 can include a set 326 of aggregated or collected information records 328 from multiple cloud provider catalogs (not shown). The provider catalog information can include information about cloud appliances, e.g., virtual machines, operating systems, and application combinations, that are available, as well as various business terms for the cloud appliances, including support levels, fees, licensing constructs, etc. Databases 330 can also include mapping rules for the multiple clouds 304 and 306, which can be used to match available cloud appliances to the user's requested set of services.

The matching module 324 can also store and maintain the set 326 of information records 328 in a database 330. The database 330 can be stored in computer readable storage devices or media (CD, DVD, hard drive, portable storage memory, etc.) whether local to the matching system 302 or remotely located. In embodiments, to select information records 328, the matching module 324 can be configured to include the necessary logic, commands, instructions, and protocols to search the set 326 of information records 328 and to retrieve the information records 328 that match a user's services request. For instance, the matching module 324 can be configured to include the necessary queries and commands to communicate with and retrieve information from the repository 330.

In embodiments, the matching module 324 can be configured to match the available cloud appliances 316 and 318 to the user requested services. For example, the matching module 324 can compare the user's request with the collected information stored in databases 330. Parameters that can be compared, include but are not limited to, type and number of hardware resources to be utilized (e.g., amount of processing cycles utilized, amount of network bandwidth, amount of storage space, amount of memory, etc.), the type and number of software resources to be utilized, the duration that the hardware and software resources need to be utilized, the current fees for using the clouds 304 and 308, number and type of the cloud appliances 316 and 318 instantiated or available, start time and duration of the cloud appliances 316 and 318, software programs utilized by the cloud appliances 316 and 318, and the like.

In embodiments, in order to match user requested services with collected information about the available cloud appliances 316 and 318, the matching module 324 can be configured to communicate with the cloud management systems 320 and 322 of the clouds 304 and 306, respectively. For example, the matching module 324 can be configured to communicate with the cloud management systems 320 and 322 in order to collect information about the usage of the clouds 304 and 306. Likewise, the matching module 324 can be configured to communicate with the cloud appliances 316 and 318 to collect information about the details of the cloud appliances 316 and 318.

In embodiments, to communicate with the clouds 304 and 306, the matching module 324 can be configured to establish a connection with the cloud 304 and 306 via the network 308. In particular, the matching module 324 can be configured to establish a connection with the cloud management systems 320 and 322 and/or a connection to the cloud appliances 316 and 318. To achieve this, the matching module 324 can be configured to include the necessary logic, instructions, commands, and protocols to communicate with the cloud management systems 320 and 322 and/or a connection to the cloud appliances 316 and 318 via network 308. For example, the matching module 324 can be configured to establish a connection using network protocols, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the matching module 324 can be configured to generate reports 332 to provide the matched information to the user 310. Reports 332 can include the following information in many different combinations, for example, information related to the user's request, information corresponding to available cloud appliances, and information corresponding to various matched available cloud appliance combinations. The report can provide and/or present the above information in any format desired by the matching service 302 or the user 310, e.g., a list, a table, etc. Also, as one of ordinary skill in the art will recognize, the information provided in report 332 can include as little or as much information as desired. The matching module 324 can be configured to generate the report in any format to display the matched information to the user 310. To achieve this, the matching module 324 can include the necessary logic, commands, instructions, and protocols to retrieve the collected information from the user record 328 and organize the matched information into the report 332.

In embodiments, the matching module 324 can be configured to generate and provide the reports 332 to the user when requested. The matching module 324 can be configured to receive the request for the report via the interface 334. Likewise, the matching module 324 can be configured to provide the reports 332 via the interface 334. Additionally, the matching module 324 can provide the reports to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, user 310 receives the report 332 and can select at least one of the matched available cloud appliances 316 and/or 318 to instantiate the requested services. Once user 310 selects at least one of the matched available cloud appliances, user 310 can send the selection through interface 334 to matching module 324. When matching module 324 receives the user selection, matching module 324 can instantiate the selected matched available cloud appliance.

Figure 4:
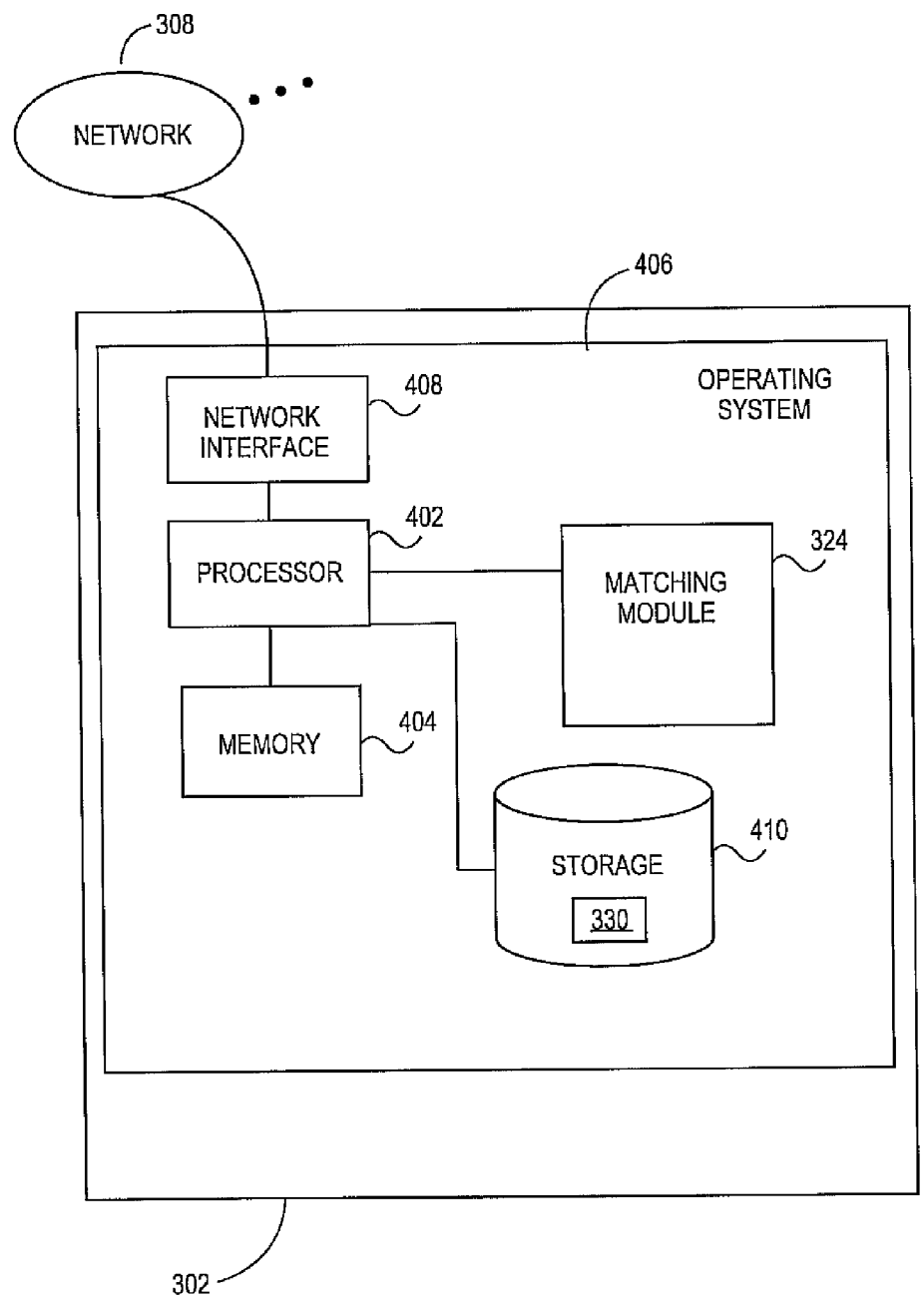
FIG. 4 illustrates an exemplary hardware configuration for a matching system, according to various embodiments.

FIG. 4 illustrates an exemplary diagram of hardware and other resources that can be incorporated in the matching system 302, which can implement matching module 324, and configured to communicate with the clouds 304 and 306 via one or more networks 308, according to embodiments. In embodiments as shown, the matching system 302 can comprise a processor 402 communicating with memory 404, such as electronic random access memory, operating under control of or in conjunction with operating system 406. Operating system 406 can be, for example, a distribution of the Linux™ operating system, such as SELinux, the Unix™ operating system, or other open-source or proprietary operating system or platform. Processor 402 also communicates with one or more computer readable storage medium 410, such as hard drives, optical storage, and the like, which can store the repository 330. Processor 402 further communicates with network interface 408, such as an Ethernet or wireless data connection, which in turn communicates with one or more networks 308, such as the Internet or other public or private networks.

Processor 402 also communicates with the matching module 324 to execute control logic and allow for matching computing processes as described above and below. Other configurations of the matching system 302, associated network connections, and other hardware and software resources are possible.

While FIG. 4 illustrates the matching system 302 as a standalone system including a combination of hardware and software, the matching system 302 can include multiple systems operating in cooperation. The matching module 324 can be implemented as a software application or program capable of being executed by the matching system 302, as illustrated, or other conventional computer platforms. Likewise, the matching module 324 can also be implemented as a software module or program module capable of being incorporated in other software applications and programs. In either case, the matching module 324 can be implemented in any type of conventional proprietary or open-source computer language. When implemented as a software application or program code, the matching module 324 can be stored in a computer readable storage medium, such as storage 410 accessible by the matching system 302. Likewise, during execution, a copy of the matching module 324 can be stored in the memory 404.

Figure 5:
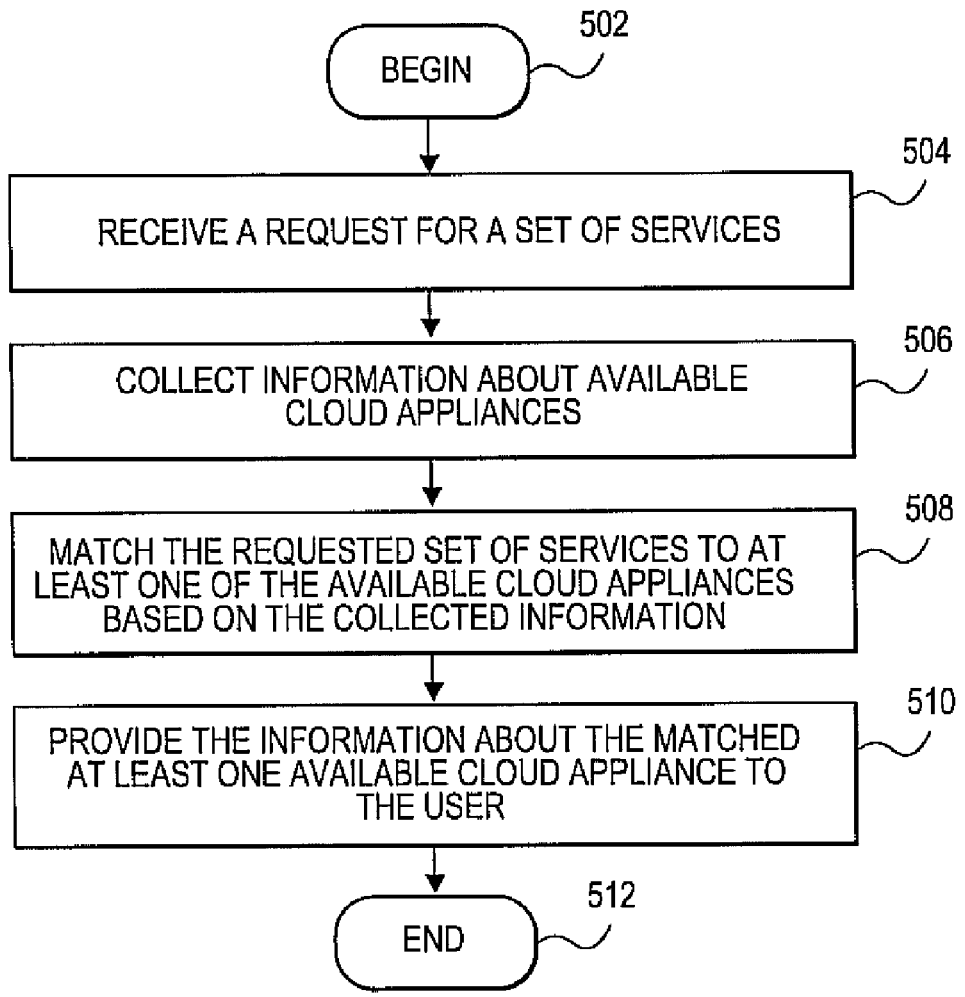
FIG. 5 illustrates a flowchart of an exemplary process for matching resource requests with cloud computing environments, according to various embodiments.

FIG. 5 illustrates a flow diagram of an exemplary process for matching clouds, according to embodiments. In 502, processing can begin. In 504, the matching system 302 can receive a request to instantiate a set of services from a user 310. For example, the matching system 302 can provide the interface 334 to receive the request. The request can include information related to a recommended deployment configuration to be matched to cloud appliances 316 and 318. For example, the user request can include information related to a previously purchased license, resource credit, or subscription for a specific vendor/applicant combination, e.g., on-premise socket-based license for Adobe Acrobat for a certain number of users.

In 506, the matching system 302 can collect information about available cloud appliances from various databases 330, clouds 304 and 306, etc. The information can include available virtual machine, operating system, and application combinations, as well as business terms, e.g., support level fees, licensing constructs, etc. One of ordinary skill in the art will understand that step 506 can be done on a periodic basis as well as on demand, and therefore does not necessarily have to be done in the order indicated in FIG. 5.

In 508, the matching system 302 can match the requested set of services to at least one of the available cloud appliances 316 and/or 318 based on the collected information in step 506. For example, if the user request included information related to a previously purchased on-premise socket-based license for Adobe Acrobat, the matching system 302 can compare the resource requirements of the previously purchased on-premises license to the resources of the available cloud appliances and then identify at least one combination of cloud appliances, e.g., two virtual machine instances of Adobe Acrobat when run on cloud 1 for each user, that meets the resource requirements of the previously purchased on-premise license.

In 510, the matching system 302 can provide the information about the matched at least one available cloud appliance 316 and/or 318 to the user 310. For example, the matching system 302 can generate reports 332 and provide the reports 332 to the user 310. The matching system 302 can provide the reports via the network 308. In 512, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" or "and/or" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving a request from a user to instantiate a set of services in a cloud;
   accessing, by a processor, at least one database comprising a catalog of available cloud appliances;
   matching, by the processor, the request with at least one available cloud appliance from the catalog of available cloud appliances;
   providing information about the at least one available cloud appliance, matched with the request, to the user; and
   instantiating, by the processor, the requested set of services in the matched at least one available cloud appliance.

2. The method of claim 1, further comprising accessing corresponding costs of the available cloud appliances in the catalog.

3. The method of claim 1, wherein receiving the request comprises receiving a request based on a deployment recommended configuration for the set of services.

4. The method of claim 1, wherein receiving the request comprises receiving information corresponding to at least one of a previously purchased license, resource credit, or subscription.

5. The method of claim 4, wherein receiving information corresponding to the at least one previously purchase license, resource credit, or subscription comprises receiving information corresponding to an on-premise license or subscription.

6. The method of claim 4, wherein matching the request with at least one available cloud appliance comprises:
   comparing resource requirements of the at least one previously purchased license, resource credit, or subscription to resources of the at least one available cloud appliance; and
   identifying at least one combination of cloud appliances that meets the resource requirements of the at least one previously purchased license, resource credit, or subscription.

7. The method of claim 1, wherein the request to instantiate a set of services in a cloud comprises a request to instantiate one or more virtual machines and wherein the instantiating the requested set of services in the matched at least one available cloud appliance comprises instantiating one or more virtual machines in the matched at least one available cloud appliance.

8. The method of claim 1, wherein the matched at least one available cloud appliance comprises a plurality of available cloud appliances and where instantiating the requested set of services in the matched at least one available cloud appliance comprises instantiating the requested set of serves in the plurality of available cloud appliances.

9. A method comprising:
   sending a request to instantiate a set of services;
   receiving, by a processor, information about at least one available cloud appliance matching the set of services from a catalog of available cloud appliances stored in a database;
   selecting one or more of the at least one available cloud appliance; and
   instantiating, by the processor, the requested set of services in the matched at least one available cloud appliance.

10. The method of claim 9, wherein sending the request comprises sending recommended deployment options for the set of services.

11. The method of claim 9, wherein sending the request comprises sending information regarding at least one previously purchased license resource credit, or subscription.

12. The method of claim 11, wherein the information is regarding an on-premise license, resource credit, or subscription.

13. A system comprising:
   a network interface to at least one cloud computing system; and
   a processor coupled to the network interface and configured to:
   receive a request from a user to instantiate a set of services;
   access at least one database comprising a catalog of available cloud appliances;
   match the request with at least one available cloud appliance from the catalog of available cloud appliances;
   provide information about the at least one available cloud appliance, matched with the request, to the user; and
   instantiating the requested set of services in the matched at least one available cloud appliance.

14. The system of claim 13, wherein the processor is further configured to access corresponding costs of the available cloud appliances.

15. The system of claim 13, wherein the request comprises a request based on a deployment recommended configuration.

16. The system of claim 13, wherein the request comprises information regarding at least one previously purchased license, resource credit, or subscription.

17. The system of claim 13, wherein the request comprises information regarding an on-premise license, resource credit, or subscription.

18. The system of claim 16, wherein matching the request to at least one available cloud appliance comprises:
- comparing resource requirements of the at least one previously purchased license, resource credit, or subscription to resources of the at least one available cloud appliance; and
- identifying at least one combination of cloud appliances that meets the resource requirements of the at least one previously purchased license, resource credit, or subscription.

19. A non-transitory computer readable storage medium including instructions that, when executed by a processor, cause the processor to perform a method comprising:
- receiving a request from a user to instantiate a set of services in a cloud;
- accessing, by the processor, at least one database comprising a catalog of available cloud appliances;
- matching, by the processor, the request with at least one available cloud appliance from the catalog of available cloud appliances;
- providing information about the at least one available cloud appliance, matched with the request, to the user; and
- instantiating, by the processor, the requested set of services in the matched at least one available cloud appliance.

20. The non-transitory computer readable storage medium of claim 19, wherein the method further comprises accessing corresponding costs of the available cloud appliances.

* * * * *